(12) United States Patent  
Krasnoborski et al.

(10) Patent No.: US 10,277,921 B2
(45) Date of Patent: Apr. 30, 2019

(54) HYBRID PARALLEL DECODER TECHNIQUES

(71) Applicant: NVIDIA Corporation, Santa Clara, CA (US)

(72) Inventors: Michal Krasnoborski, Lidzbark Warminski (PL); Michael Clair Houston, Saratoga, CA (US); Michael Denis O'Connor, Palo Alto, CA (US); Steven Gregory Parker, Draper, UT (US)

(73) Assignee: NVIDIA CORPORATION, Santa Clara, CA (US)

( * ) Notice: Subject to any disclaimer, the term of this patent is extended or adjusted under 35 U.S.C. 154(b) by 243 days.

(21) Appl. No.: 14/948,232

(22) Filed: Nov. 20, 2015

(65) Prior Publication Data

US 2017/0150181 A1 May 25, 2017

(51) Int. Cl.
*H04N 19/18* (2014.01)
*H04N 19/91* (2014.01)
*H04N 19/436* (2014.01)

(52) U.S. Cl.
CPC .......... *H04N 19/91* (2014.11); *H04N 19/436* (2014.11)

(58) Field of Classification Search
CPC ....... H04N 19/176; H04N 19/18; H04N 19/91
See application file for complete search history.

(56) References Cited

U.S. PATENT DOCUMENTS

| 4,509,038 | A | * | 4/1985 | Hirano | H03M 7/40 341/67 |
| 5,703,580 | A | * | 12/1997 | Ko | H03M 5/145 341/100 |
| 5,784,631 | A | * | 7/1998 | Wise | G06F 9/3867 382/246 |
| 6,205,499 | B1 | * | 3/2001 | Houlberg | H04N 19/63 375/E7.04 |
| 7,804,901 | B2 | * | 9/2010 | Molloy | H04N 19/94 375/240.22 |
| 2002/0174401 | A1 | * | 11/2002 | Wang | H03M 13/3905 714/786 |
| 2003/0028843 | A1 | * | 2/2003 | Chang | H03M 13/2957 714/786 |
| 2003/0156652 | A1 | * | 8/2003 | Wise | G06F 9/3867 375/240.26 |
| 2003/0227969 | A1 | * | 12/2003 | Wise | G06F 9/3867 375/240.1 |

(Continued)

OTHER PUBLICATIONS

Jo et al, Hybrid Parallelization for Hevc Decoder, 2013.*
Alvarez-Mesa et al, Parallel video decoding in the emerging HEVC standard, 2012.*

*Primary Examiner* — Shan E Elahi
(74) *Attorney, Agent, or Firm* — Hogan Lovells US LLP

(57) ABSTRACT

Decoder techniques in accordance with embodiment of the present technology include partially decoding a compressed file on a serial based processing unit to find offsets of each of a plurality of entropy data blocks. The compressed file and offset for each of the plurality of entropy encoded data blocks are transferred to a parallel based processing unit. Thereafter, the compressed file is at least partially decoded on the parallel based processing unit using the offset for each of the plurality of entropy encoded data blocks.

19 Claims, 4 Drawing Sheets

(56) References Cited

U.S. PATENT DOCUMENTS

| | | | | |
|---|---|---|---|---|
| 2004/0019775 A1* | 1/2004 | Wise | ............... | G06F 9/3867 |
| | | | | 712/300 |
| 2004/0025000 A1* | 2/2004 | Wise | ............... | G06F 9/3867 |
| | | | | 712/300 |
| 2004/0221143 A1* | 11/2004 | Wise | ............... | G06F 9/3867 |
| | | | | 712/300 |
| 2005/0210145 A1* | 9/2005 | Kim | ............ | G06F 17/30849 |
| | | | | 709/231 |
| 2006/0023788 A1* | 2/2006 | Otsuka | ............ | H04N 19/56 |
| | | | | 375/240.16 |
| 2009/0063931 A1* | 3/2009 | Rovini | ......... | H03M 13/1137 |
| | | | | 714/758 |
| 2010/0189064 A1* | 7/2010 | Raveendran | ...... | H04L 65/605 |
| | | | | 370/329 |
| 2010/0253972 A1* | 10/2010 | Ishikawa | ........... | G06K 15/02 |
| | | | | 358/1.15 |
| 2012/0114037 A1* | 5/2012 | Winder | ......... | H04N 21/2365 |
| | | | | 375/240.12 |
| 2014/0003498 A1* | 1/2014 | Sullivan | ............ | H04N 19/70 |
| | | | | 375/240.03 |
| 2014/0112394 A1* | 4/2014 | Sullivan | ............ | H04N 19/46 |
| | | | | 375/240.26 |
| 2014/0233633 A1* | 8/2014 | Hannuksela | ... | H04N 21/23614 |
| | | | | 375/240.02 |
| 2015/0381211 A1* | 12/2015 | Du | ............... | H03M 13/395 |
| | | | | 375/340 |

* cited by examiner

HYBRID PARALLEL DECODER TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing devices is data compression/decompression, particularly for storing and displaying image data. A common standard for compressing and decompressing image data is the Joint Expert Group (JPEG) encoding standard.

JPEG files are not generally amenable to parallel decode. A number of existing parallel decode techniques rely on modifying the image with restart markers, which requires a re-encode of the image and reduces the compression ratio. Other existing parallel decode techniques use speculative decoding, which is wasteful on power and does not offer good performance compared to the serial decode speed on a fast CPU. According there is a continuing need for improved decoding techniques that can be applied to JPEG images and other similarly encoded files.

SUMMARY OF THE INVENTION

The present technology may best be understood by referring to the following description and accompanying drawings that are used to illustrate embodiments of the present technology directed toward hybrid parallel decoder techniques.

In one embodiment, a decoder method includes partially decoding a compressed file on a serial based processing unit to find offsets of each of a plurality of entropy encoded data blocks. The compressed file may be a JPEG encoded file. The serial based processing unit may be a CPU. The compressed file and offset for each of the plurality of entropy encoded data blocks is transferred to a parallel based processing unit. The parallel based processing unit may be a GPU. The compressed file may be transferred to the GPU while the CPU is determining offsets of each of a plurality of entropy data block. Thereafter, the compressed file is at least partially decoded on the parallel based processing unit using the offset for each of the plurality of entropy encoded data blocks. Sets of blocks of the compressed file may be decoded in parallel by respective cores or engines of the parallel based GPU. The GPU may perform Huffman decoding to determine DCT coefficients. The DCT coefficients may then be de-quantized and inverse-DCT to reconstruct the image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
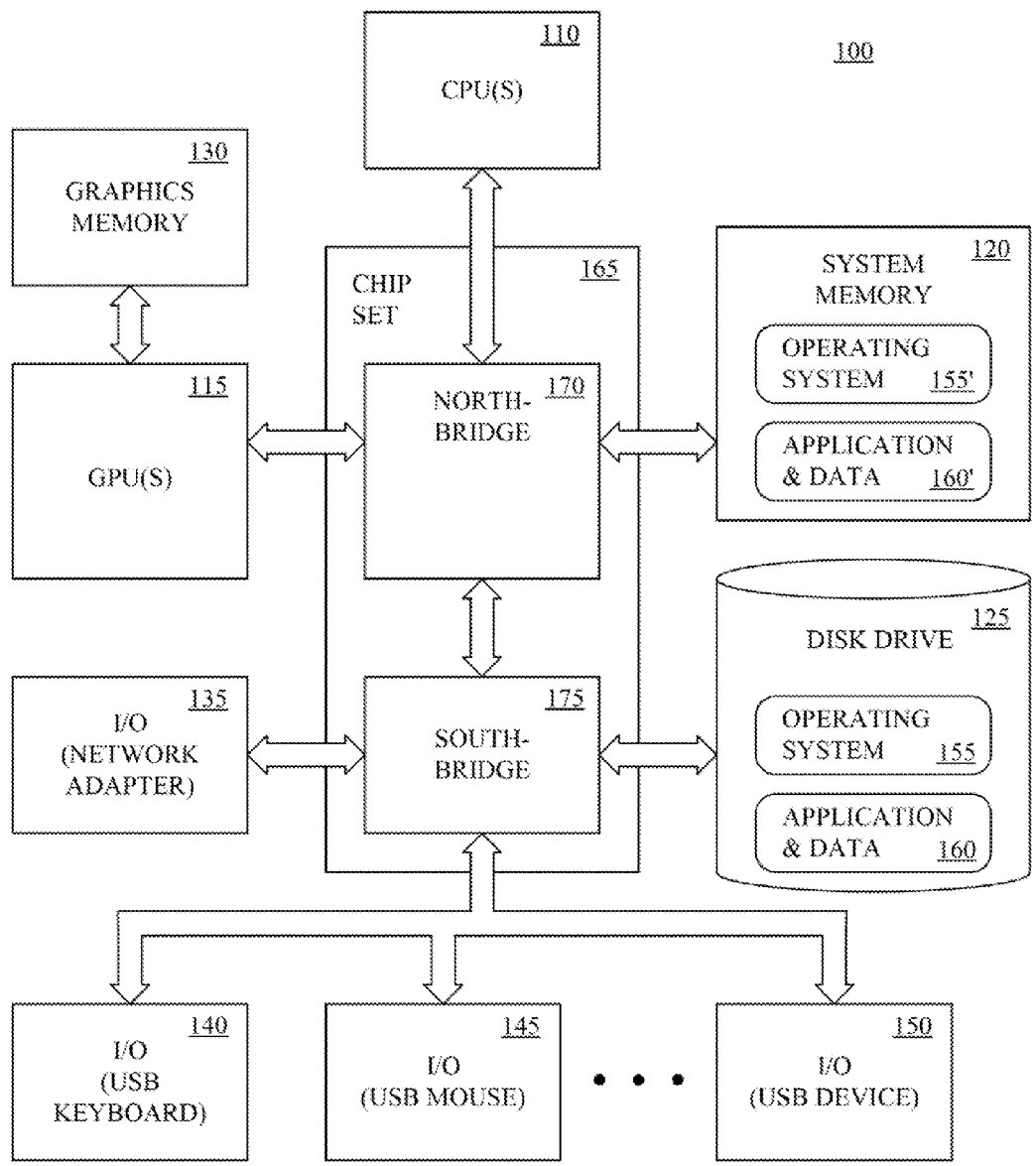
FIG. 1 shows a block diagram of an exemplary computing device for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, an exemplary computing device for implementing embodiments of the present technology, is shown. The computing device 100 may be a personal computer, laptop computer, tablet computer, smart phone, game console, server computer, client computer, distributed computer system, or the like. The computing device 100 includes one or more central processing units (CPU) 110, one or more specialized processing units such as graphics processing units (GPU) 115, one or more computing device-readable media 120, 125, 130 and one or more input/output (I/O) devices 135, 140, 145, 150. The I/O device 135, 140, 145, 150 may include a network adapter (e.g., Ethernet card), CD drive, DVD drive and/or the like, and peripherals such as a keyboard, a pointing device, a speaker, a printer, and/or the like.

The computing device-readable media 120, 125, 130 may be characterized as primary memory and secondary memory. Generally, the secondary memory, such as a magnetic and/or optical storage, provides for non-volatile storage of computing device executable instructions and data for use by the computing device 100. For instance, the disk drive 125 may store the operating system (OS) 155 and applications and data 160. The primary memory, such as the system memory 120 and/or graphics memory 130, provides for volatile storage of computing device executable instructions and data for use by the computing device 100. For instance, the system memory 120 may temporarily store a portion of the operating system 155' and a portion of one or more applications and associated data 160' that are currently used by the CPU 110, GPU 115, and the like.

The computing device-readable media 120, 125, 130, I/O devices 135, 140, 145, 150, and GPU 115 may be communicatively coupled to the processor 110 by a chip set 165 and one or more busses. The chipset 165 acts as a simple input/output hub for communicating data and instructions between the processor 110 and the computing device-readable media 120, 125, 130, I/O devices 135, 140, 145, 150, and GPU 115. In one implementation, the chipset 165 includes a northbridge 170 and southbridge 175. The northbridge 170 provides for communication with the processor 110 and interaction with the system memory 115. The southbridge 175 provides for input/output functions.

Figure 2:
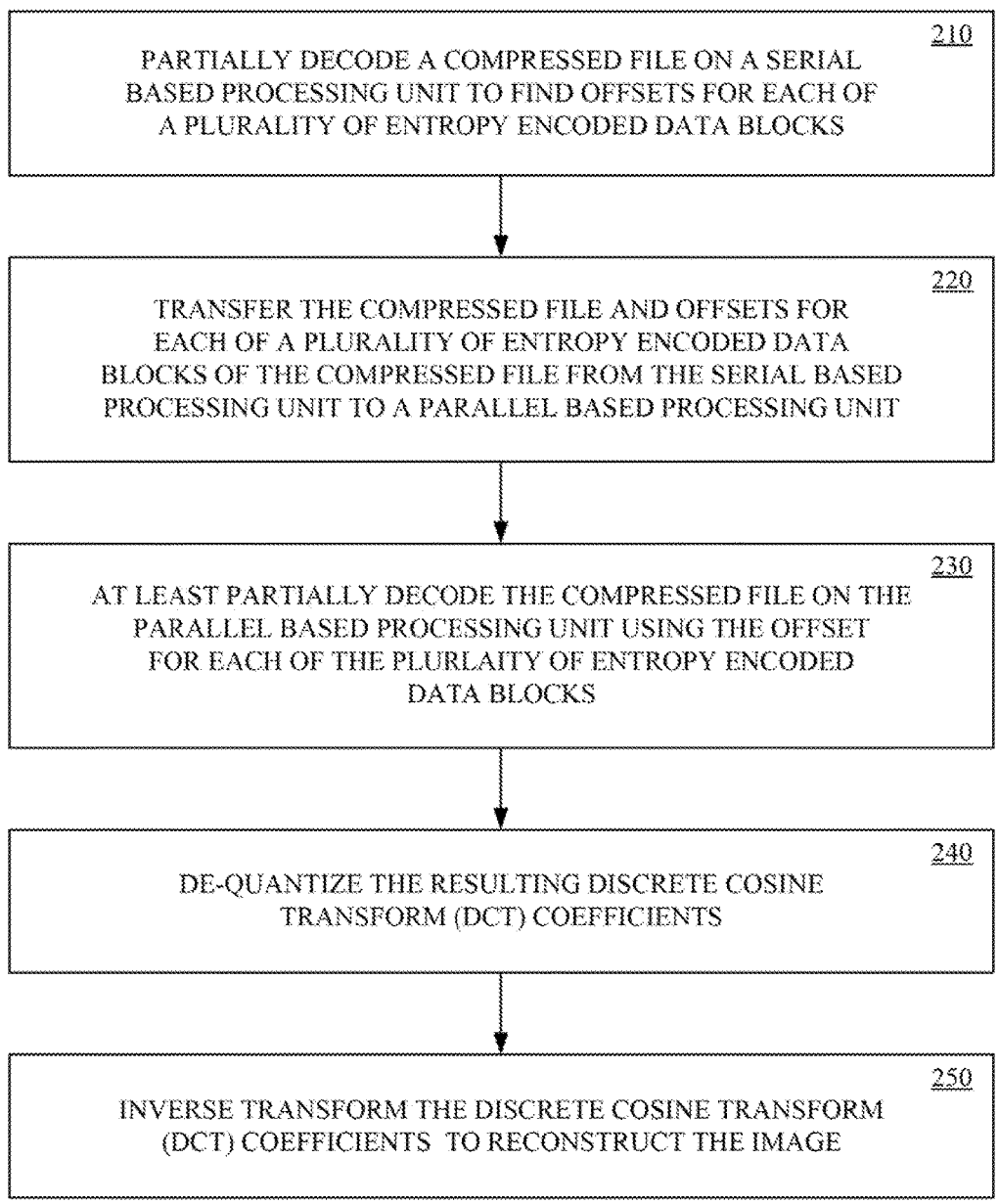
FIG. 2 shows a flow diagram of a decoding method, in accordance with embodiments of the present technology.

Referring now to FIG. 2, a decoding method, in accordance with embodiments of the present technology, is shown. The method may be implemented in hardware, firmware and/or as computing device executable instructions (e.g., computer program) that are stored in computing device-readable media (e.g., computer memory) and executed by a computing device (e.g., processor). The decoding method will be described with reference to the exemplary computing device 100 as described above.

The method begins with partially decoding a compressed file on a serial base processing unit to find the offsets for each of a plurality of entropy encoded data blocks, at 210. The serial based processing unit parses the compressed file to determine offset values for markers indicating the start or end of each of the plurality of data blocks.

In one implementation, the compresses file may be a JPEG file, or the like. The entropy encoded data block may be Huffman encoded data blocks or the like. In one implementation, the serial based processing unit may be a central processing unit (CPU) 110 of computing device 100.

The partial decoding of the compressed file on the serial based processing unit may be performed relative quickly because intermediate data associated with the partial decoding does not need to be stored.

At 220, the compressed file and offsets for each of the plurality of entropy encoded data blocks thereof are transferred from the serial based processing unit to a parallel based processing unit. In one implementation, the compressed file may be transferred to the parallel based processing unit while the compressed file is also being partially decoded by the serial based processing unit to find the offset for each of the plurality of entropy encoded data blocks.

In one implementation, the parallel based processing unit may be a graphics processing unit (GPU) 115 of computing device 100. In one implementation, the JPEG file and byte and bit offset values for the start of each Huffman encoded data block are transferred from the CPU 110 to the GPU 115. The CPU may also send descriptions of the Huffman trees to the GPU. The CPU may also send identifiers of the Huffman table to use for each block.

At 230, the compressed file is partially decoded on the parallel base processing unit using the offset for each of the plurality of entropy encoded data blocks to determine blocks of quantized discrete cosine transform (DCT) coefficients for each of the sub-images.

In one implementation, the blocks are Huffman decoded using the offset for each of the plurality of Huffman encoded data blocks by the GPU 115. Two or more blocks may be decoded at a time in parallel with each other by respective processing cores of the GPU, respective decode engines of the GPU, respective GPUs in a computing device including a plurality of GPUs, or the like.

In one implementation, the DCT coefficients of the Huffman encoded data blocks may be copied to the CPU, wherein prefix summing is performed thereon, before being copied back to the GPU.

The GPU may use bitbuffers for decoding the Huffman encoded data blocks. The data may be decoded using an 8-bit lookup, with longer symbols being decoded bit by bit. The output may be transposed (e.g., in 64×64 chunks) to make writes coalesced using a separate (e.g., in place) transpose kernel. The decoding can operate on interleaved blocks, using additional chunks of memory. The interleaved blocks may be decoded using plane extraction.

At 240, the blocks of quantized DCT are de-quantized to determine blocks of DCT coefficients for each of the sub-images. At 250, the blocks of DCT coefficients are inverse transformed (IDCT) to determine blocks of frequency domain samples for each of the sub-images. The blocks of frequency domain samples for each of the sub-images comprise the reconstructed (e.g., decoded) image. The blocks of frequency domain samples for each of the sub-images may then be utilized to drive a display to output the corresponding decoded image.

Figure 3:
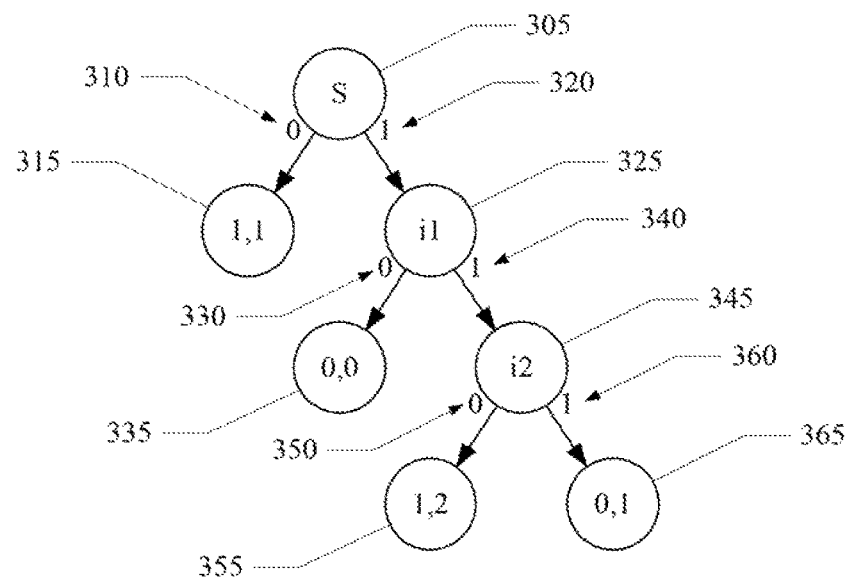
FIG. 3 shows a simple Huffman decoding example.

Referring now to FIG. 3, a simple Huffman decoding example is shown. The Huffman decoding illustrated in FIG. 3 is based upon the simple Huffman table T1 as follows:

TABLE T1

| BIT STRING | RUN LENGTH OF ZEROS | PAYLOAD WIDTH |
|---|---|---|
| 0X | 1 | 1 |
| 10 | 0 | 0 |

TABLE T1-continued

| BIT STRING | RUN LENGTH OF ZEROS | PAYLOAD WIDTH |
|---|---|---|
| 110XX | 1 | 2 |
| 111X | 0 | 1 |

It is appreciated that the Huffman table of T1 does not illustrate an actual Huffman coding used in JPEG files. Typically each JPEG file can define its own Huffman trees. Although it's possible that the trees depicted in the drawings may occur in a real JPEG file, it is very unlikely. Instead, the Huffman table of T1is over simplified and is used herein to demonstrate how to implement embodiments of the present technology.

It is appreciated that the corresponding Huffman tree of FIG. 3 may readily be generated from the Huffman table T1, and vice versa. Beginning at start node (s) 305, the Huffman tree branches left 310 in this example if the first bit is a '0', wherein the run length of preceding zeros is 1 and the payload width is 1 at leaf node 315. The run length of preceding zeros is the number of coefficients that have zero values that come before the non-zero coefficient encoded in the payload width. From the payload width, there is one bit remaining to be decoded.

If the first bit is a '1' the Huffman tree in this example branches right 320 to a first intermediate node (i1) at 325. At the first intermediate node (i1), the Huffman tree branches left 330 if the second bit in the string is a '0', wherein the run length of preceding zeros is 0 and the payload width is 0 at leaf node 335. Therefore, there are no remaining bit to be decoded, as indicated by the payload width.

If the second bit is a '1' the Huffman tree branches right 340 to a second intermediate node (i2) at 345. At the second intermediate node (i2), the Huffman tree branches left 350 if the third bit in the string is a '0', wherein the decoded run length of preceding zeros is 1 and the payload width is 2 at leaf node 355. Therefore, there is one bit remaining to be decoded, as indicated by the payload width. Alternatively, the Huffman tree branches right 360 if the third bit in the string is a '1', wherein the decoded run length of preceding zeros is 0 and the payload width is 1 at leaf node 365. Therefore, there is one bit remaining to be decoded, as indicated by the payload width.

Figure 4:
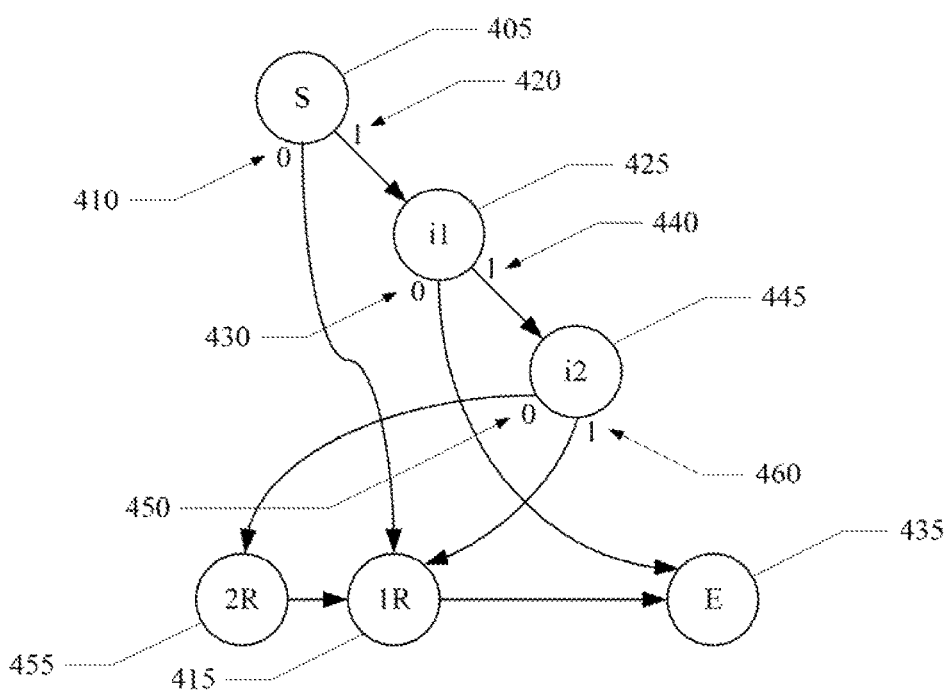
FIG. 4 shows a simple Huffman decoding state machine implementation.

A given Huffman coding (e.g., table or tree) may be converted to a state machine. Referring now to FIG. 4, a state machine based upon the Huffman table T1 or Huffman tree of FIG. 3 is shown. The state machine of FIG. 4 does not illustrate an actual Huffman coding used in JPEG files. Again, each JPEG file can define its own Huffman trees. Although it's possible that the trees depicted in the drawings may occur in a real JPEG file, it is very unlikely. Instead, the state machine illustrated in FIG. 4 is intended to teach how to create an appropriate state machine for use in Huffman encoded JPEG files.

The Huffman tree is converted to a decoding state machine by replacing the leaf nodes indicating the run length of zeroes and payload width, with the states corresponding to the number of bit remaining to be decoded. For example, if the first bit is a '0', the Huffman tree indicates that there is one bit remaining to decode. Therefore, if the first bit is a '0' 410, the state machine proceeds from the 'start' state (S) at 405 to 'one bit remaining' state (1R) at 415.

If the first bit is a '1' 420, the state machine proceed from the start state (S) to a 'first intermediate' state (i1) at 425.

The Huffman tree indicates that there is no bit remaining to decode if the first bit is a ' ' and the second bit is a '0'. Therefore, if the second bit is a '0' 430, the state machine proceeds from the 'first intermediate' state (i1) to the 'end' state (E) at 435.

If the first and second bit are '1' 440, the state machine proceeds from the 'first internal' state (i1) to a 'second internal' state (i2) at 445. The Huffman tree indicates that there are two bits remaining to decode if the first and second bits are '1' and the third bit is a '0'. Therefore, if the third bit is a '0' 450, the state machine proceeds from the 'second internal' state (i2) to the 'two bits remaining' state (2R) at 455. Likewise, the Huffman tree indicates that there is one bit remaining to decode if the first, second and third bits are '1'. Therefore, if the third bit is a '1' 460, the state machine proceeds from the 'second internal' state (i2) to the 'one bit remaining' state (1R) at 415.

From the 'two bit remaining' state (2R) 455, the state machine proceeds to the 'one bit remaining' state (1R) 415. Likewise, from the 'one bit remaining' state (1R) 415, the state machine proceeds to the 'end' state (E) 435.

Figure 5:
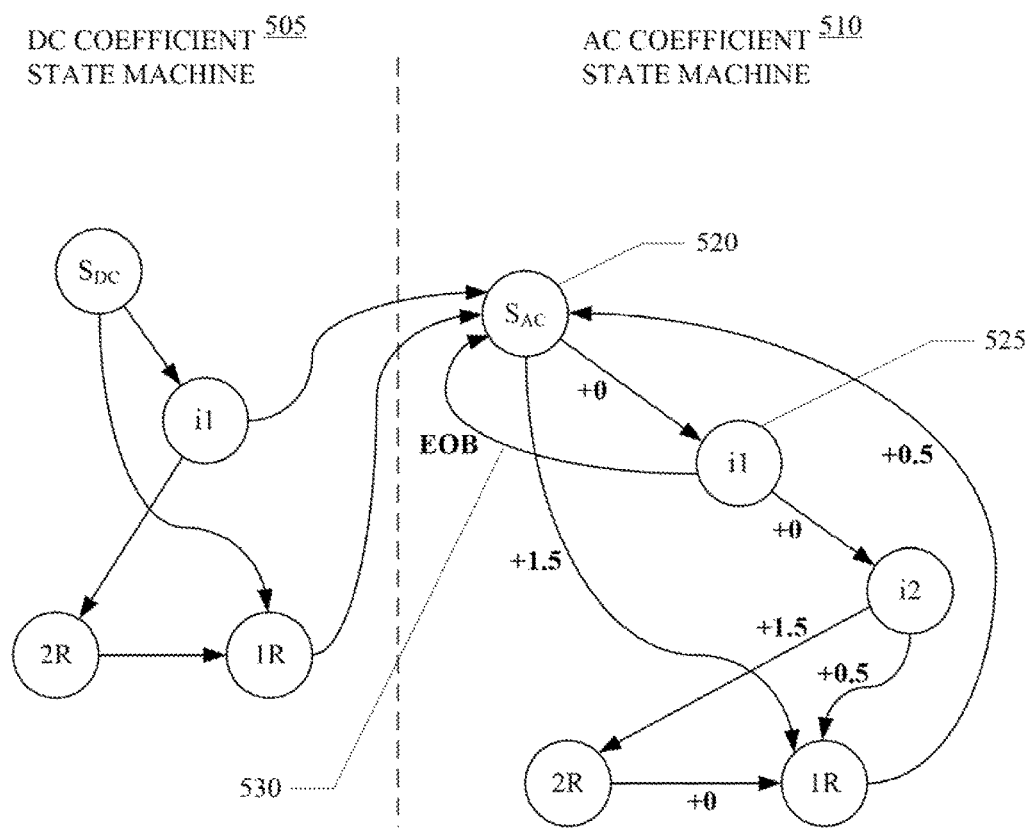
FIG. 5 shows an end-of-block (EOB) detecting state machine illustrating embodiment of the present technology.

Referring now to FIG. 5, an end-of-block (EOB) detecting state machine illustrating embodiments of the present technology is shown. Again, the state machine of FIG. 5 does not illustrate an actual Huffman coding used in JPEG files. Typically each JPEG file can define its own Huffman trees. Although it's possible that the trees depicted in the drawings may occur in a real JPEG file, it is very unlikely. Instead, FIG. 5 is intended to demonstrate how to create an end-of-block (EOB) detecting state machine for use on Huffman encoded JPEG files.

The JPEG bit stream of each block includes one DC coefficient and sixty three AC coefficients. Typically, there will be one Huffman table/tree for the DC coefficients and one Huffman table/tree for the AC coefficients. Therefore, the state machines for decoding the DC coefficient and AC coefficients may be merged, as illustrated in FIG. 5, to reduce the need to replicate of the state machine 64 time. Accordingly, the end-of-block (EOB) detecting state machine includes a portion for decoding the DC coefficient 505 coupled to a portion for decoding the AC coefficients 510. Parsing a DC coefficient ends on transition to the AC Start ($S_{AC}$) state 520. Parsing each AC coefficient ends on a return to the AC Start ($S_{AC}$) state 520. Furthermore, the EOB 530 is detected upon return from a particular state to the AC Start ($S_{AC}$) state 520. In particular the EOB marker is '00'. In the example of FIG. 5, the EOB 530 is detected upon return from the 'first internal' state 525 to the AC Start ($S_{AC}$) state 520. In other words, when the EOB edge 530 is traversed. The end of block may also be detected when a count of the number of coefficients indicates that all AC coefficients have been parsed. In such case, the end of block is detected when the counter reaches 63. To account for the run length of zeroes in the Huffman tree, the edges of the state machine are associated with counting in half-coefficients. Utilizing edge counts, the EOB is detected when the sum of the edges on the path from the AC Start ($S_{AC}$) state 520 to the current state is equal to 63.

In addition, the EOB detecting state machine may be backed-up by a parsing look-up-table (LUT). The parsing LUT maps combinations of current states and bytes of Huffman encoded data to next states and numbers of parsed coefficients. The current state (current_state) and byte value (byte) of the Huffman bit stream are used as an index for the parsing LUT to determine the next state (next_state) in the EOB detecting state machine and the number of parsed coefficients (#_parsed_coefficients) for the byte value (e.g., LUT[current_state, byte]=[next_state, #_parsed_coefficients]). In accordance with the JPEG specification, there is a maximum of 200 states in the EOB detecting state machine. Therefore, the parsing LUT readily fits in a cache of the CPU. The parsing LUT may be generated along with generating the Huffman tables. The parsing LUT may be generated while the image data is being copied to the GPU. The parsing LUT may be generated by a simple recursive function.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   partially decoding a compressed file on a serial based processing unit to find offsets for each of a plurality of entropy encoded data blocks for each of a plurality of sub-images;
   transferring the compressed file and the offsets for each of the plurality of entropy encoded data blocks for each of the sub-images to a parallel based processing unit; and
   partially decoding of the compressed file on the parallel based processing unit using the offsets for each of the plurality of entropy encoded data blocks for each of the sub-images.

2. The method according to claim 1, wherein the compressed file comprises a Joint Photographic Expert Group (JPEG) encoded file.

3. The method according to claim 1, wherein the serial based processing unit comprises a central processing unit (CPU); and the parallel based processing unit comprises a graphics processing unit (GPU).

4. The method according to claim 1, wherein partially decoding the compressed file on the serial based processing unit comprises parsing the compressed file to determine byte and bit offset values of the start of each of the plurality of entropy encoded data blocks for each of the sub-images.

5. The method according to claim 1, wherein the entropy encoded data blocks comprises Huffman encoded data blocks.

6. The method according to claim 1, wherein partially decoding of the compressed file on the parallel based processing unit comprises Huffman decoding the compressed file using the offsets for each of the plurality of entropy encoded data blocks to determine blocks of quantized discrete cosine transform (DCT) coefficients for each of the sub-images, wherein sets of blocks are processed by respective cores or engines of the parallel based processing unit.

7. The method according to claim 6, wherein partially decoding of the compressed file on the parallel based processing unit further comprises de-quantizing the blocks of quantized discrete cosine transform (DCT) coefficients to determine blocks of discrete cosine transform (DCT) coefficients for each of the sub-images.

8. The method according to claim 7, wherein partially decoding of the compressed file on the parallel based processing unit further comprises inverse transforming the blocks of discrete cosine transform (DCT) coefficients to determine blocks of frequency domain samples for each of the sub-images.

9. The method according to claim 8, wherein the blocks of frequency domain samples for each of the sub-images comprises blocks of frequency domain samples for each respective component in the Y, Cb, Cr color domain.

10. The method according to claim 1, wherein partially decoding the compressed file on the serial based processing unit to find offsets for each of the plurality of entropy encoded data blocks comprises utilizing an end-of-block (EOB) detecting state machine to detecting a transition from a particular state to an AC start state.

11. The method according to claim 10, wherein partially decoding the compressed file on the serial based processing unit to find offsets for each of the plurality of entropy encoded data blocks further comprises decoding blocks of the compressed file in bytes of data utilizing a parsing look-up-table (LUT).

12. A method comprising:
    partially decoding a Joint Photographic Expert Group (JPEG) encoded file on a serial based central processing unit (CPU) to find offsets of each of a plurality of Huffman encoded data blocks of each of the Y, Cb, Cr sub-images;
    transferring the JPEG encoded file and the offsets for each of the plurality of Huffman encoded data blocks of each of the Y, Cb, Cr sub-images to a parallel based graphics processing unit (GPU); and
    partially decoding the JPEG encoded file on the parallel based GPU using the offsets for each of the plurality of Huffman encoded data blocks for each of the Y, Cb, Cr sub-images.

13. The method according to claim 12, wherein the JPEG encoded file is transferred to the parallel based GPU at least partially while the JPEG encoded file is partially decoded on the serial based CPU.

14. The method according to claim 12, wherein partially decoding the compressed file on the serial based CPU comprises parsing the JPEG encoded file to determine byte and bit offset values of the start of each of the plurality of Huffman encoded data blocks for each of the Y, Cb, Cr sub-images.

15. The method according to claim 12, wherein partially decoding of the JPEG encoded file on the parallel based GPU comprises Huffman decoding the JPEG encoded file using the offsets for each of the plurality of Huffman encoded data blocks to determine blocks of quantized discrete cosine transform (DCT) coefficients for each of the Y, Cb, Cr sub-images, wherein sets of blocks are processed by respective cores or engines of the parallel based GPU.

16. The method according to claim 15, wherein partially decoding of the compressed file on the parallel based GPU further comprises de-quantizing the blocks of quantized discrete cosine transform (DCT) coefficients to determine blocks of discrete cosine transform (DCT) coefficients for each of the Y, Cb, Cr sub-images.

17. The method according to claim 16, wherein partially decoding of the compressed file on the parallel based GPU further comprises inverse transforming the blocks of discrete cosine transform (DCT) coefficients to determine blocks of frequency domain samples for each of the Y, Cb, Cr sub-images.

18. The method according to claim 12, wherein partially decoding the JPEG encoded file on the CPU to find offsets for each of the plurality of Huffman encoded data blocks comprises utilizing an end-of-block (EOB) detecting state machine to detecting a transition from a particular state to an AC start state.

19. The method according to claim 18, wherein partially decoding the JPEG file on the CPU to find offsets for each of the plurality of Huffman encoded data blocks further comprises decoding blocks of the JPEG file in bytes of data utilizing a parsing look-up-table (LUT).

\* \* \* \* \*